United States Patent [19]

Cheney

[11] 4,305,965

[45] Dec. 15, 1981

[54] BACON AND MEAT ANALOGUES

[75] Inventor: Earl J. Cheney, Calgary, Canada

[73] Assignee: Burns Foods Limited, Alberta, Canada

[21] Appl. No.: 40,183

[22] Filed: May 18, 1979

Related U.S. Application Data

[63] Continuation-in-part of Ser. No. 844,385, Oct. 21, 1977, Pat. No. 4,196,222, and a continuation-in-part of Ser. No. 835,819, Sep. 22, 1977, abandoned.

[51] Int. Cl.$^3$ .......................... A23L 1/31; A23B 4/02
[52] U.S. Cl. ..................... 426/104; 426/264; 426/265; 426/266; 426/646; 426/656; 426/516; 426/802
[58] Field of Search ............... 426/104, 264, 265, 266, 426/532, 646, 656, 516, 802

[56] References Cited

U.S. PATENT DOCUMENTS

| | | | |
|---|---|---|---|
| 3,840,677 | 10/1974 | Leidy et al. | 426/802 X |
| 3,852,487 | 12/1974 | Van Werven et al. | 426/646 X |
| 3,857,986 | 12/1974 | Svendsen | 426/646 X |
| 3,890,451 | 6/1975 | Keszler | 426/264 |
| 4,057,650 | 11/1977 | Keszler | 426/646 X |
| 4,061,789 | 12/1977 | Warren | 426/802 X |
| 4,132,810 | 1/1979 | Knutson | 426/802 X |

FOREIGN PATENT DOCUMENTS 716536  8/1965  Canada ............................ 426/646

*Primary Examiner*—Robert A. Yoncoskie
*Attorney, Agent, or Firm*—Cushman, Darby & Cushman

[57] ABSTRACT

A bacon analogue and similar multi-phased meat products which can duplicate the texture, appearance and content of natural bacon and other multi-phased meat products is obtained by preparing a comminuted fat component which is treated with a curing pickle and preparing a separate comminuted lean component which may be mixed with optional additives such as flavoring, seasoning and preservatives and thereafter utilized to form a layered product by such processes as extruding the comminuted fat and lean components through a predetermined forming die to unite the fat and lean components to form a bacon analogue or other such multi-phased meat products. This multi-phased meat analogue may then be placed in pans and heated, smoked and cured and then be cooled, sliced and packaged and thereafter be ultimately used and cooked like natural multi-phased meat products.

16 Claims, 3 Drawing Figures

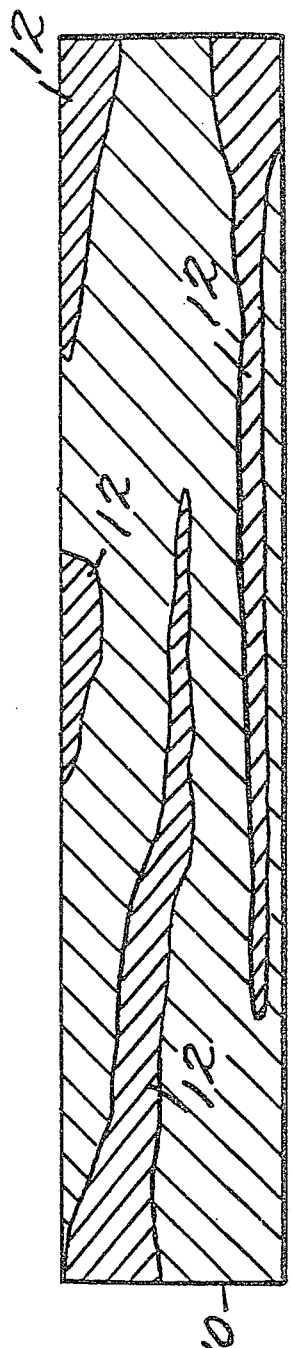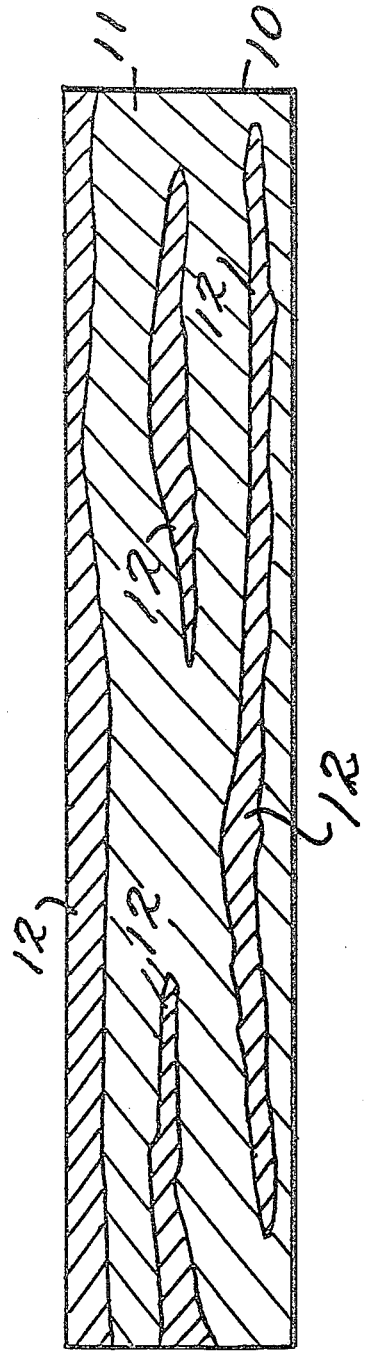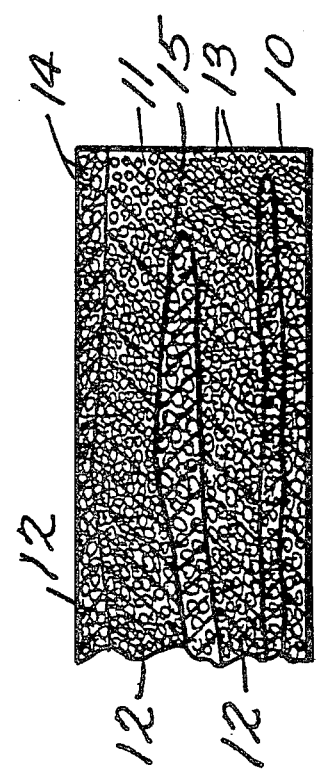

BACON AND MEAT ANALOGUES

BACKGROUND OF THE INVENTION

This application is a continuation-in-part of U.S. Application Ser. No. 844,385 for "A Process for the Preparation of Meat and Bacon Analogues" filed Oct. 21, 1977, now U.S. Pat. No. 4,196,222 and application is a continuation-in-part of U.S. Application Ser. No. 835,819 for "Process for the Preparation of Bacon Analogues and the Like" filed Sept. 22, 1977, now abandoned.

1. Field of the Invention

This invention relates to a new bacon analogue and similar multi-phased meat products and a novel process for forming the bacon analogue and related multi-phased meat products of the invention. More particularly, a bacon analogue formed in accordance with the invention exhibits the texture, appearance and taste of natural bacon while maintaining the lead and fat boundary cohesion and integrity when fried or otherwise cooked like bacon obtained from pork bellies.

2. Description of the Prior Art

Sausage meat type products have been available which were formed in a slab and sliced in a shape similar to the conventional bacon slices but which do not duplicate the appearance or texture of natural bacon. Various vegetable protein compositions have been developed and marketed which simulate the texture and taste of the bacon strip but which generally have not duplicated the shape or have exhibited phase separation when fried or otherwise prepared as natural bacon. These meat-like preparations utilizing vegetable proteins have required various binders to maintain the integrity of the lean and non-lean portions of a bacon-like product.

However, such products are not composed of real meat and it is obvious from the looks and taste of these products that they are not bacon and that they do not resemble bacon except in some cases, for the size and shape of the slice.

Meat products formed in accordance with the invention further are readily distinguishable from prior art such as Keszler U.S. Pat. Nos. 3,890,451 and 4,057,650 in that both the fat meat component and lean meat components are comminuted to form an emulsion or finely ground extrudate in which the particles in both the fat and lean meat components are in the range of about 0.03 to 0.5 ounces or are approximately 1 to 10 millimeters in size with the preferred particle size being about 0.16 ounce or 3 millimeters. Thereafter the fat and lean meat components are layered or extruded to provide islands of fat and lean. In Keszler a creamy extrudate is combined with pieces of meat of about ¼ an ounce to 8 ounces are blended or mixed with the creamy extrudate to coat the exposed surfaces of the meat chunks to provide the necessary adhesion of the meat particles. As will be recognized the configuration of the fat and lean components in the meat analogue of the invention depends upon the manner in which the fat and lean meat components are layered or extruded whereas in the prior art the appearance of the meat analogue depends upon the size and configuration of the pieces of meat selected for the lean meat component.

It has long been a goal of the meat processing industry to produce a bacon analogue which will duplicate the appearance, taste and handling characteristics of natural bacon but which can be formed from natural meat products alone or in conjunction with other protein sources to yield bacon from products other than pork bellies and which can maintain a consistent lean to fat ratio. The bacon analogue produced should further exhibit a phase-boundary integrity similar to natural bacon and be able to thereafter be processed, cured, cooked and used in the same manner as conventional bacon.

SUMMARY OF THE INVENTION

The present invention obviates the limitations and disadvantages of prior art simulated products by providing a bacon slab analogue composed of natural meat cuts from pork, beef, fish and other protein sources that can be processed, packaged and thereafter used in the same manner as conventional bacon while exhibiting an appearance, taste and texture similar to natural bacon. More particularly, the novel bacon and other multi-phased meat products formed in accordance with the process of the present invention maintain the lean and fat phase-boundary consistency when fried and cooked in the manner ordinarily employed for natural meat products. In addition to maintaining the advantages of the natural meat product, the bacon analogue of the present invention may further be improved upon by compounding the bacon analogue in a predetermined fat to lean mixture and texture and otherwise specifically formulating it to both reduce and control the ratio of vegetable fat to animal fat and protein content of the bacon analogue.

Another aspect of the invention consists of the process of forming the bacon analogue and similar multi-phased meat products which consists of the steps of preparing a comminuted fat appearing mixture of beef, pork, lamb, poultry, fish and other such natural meats or vegetable protein or a combination of one or more of the foregoing and a comminuted lean appearing mixture of beef, pork, lamb, poultry, fish and other such natural meats or vegetable protein or a combination of one or more of the foregoing, passing the fat appearing mixture under pressure through a die and extruding the lean appearing mixture under pressure at pre-selected locations within said die to simulate the orientation of fat and lean components of a natural bacon slab, and processing the resultant slab.

The advantages of the present invention include the formation of bacon and meat analogues prepared from raw meat which when utilized in the process of the present invention can be formulated to duplicate the appearance, texture, consistency and, of course, the taste of the natural meats. The processing of the raw meat mixtures and particularly the fat component increases the natural binding ability of the novel product which exhibits an excellent binding of the layers and is hence, capable of being cooked, fried, sliced and otherwise processed in the same manner as corresponding cuts of meat obtained from natural sources.

Another aspect of the invention is the ability to utilize conventional curing, seasoning and preserving materials for the mixture.

Another object of the invention is to provide a process which produces a bacon analogue in which the proportion of lean meat to fat can be controlled as desired.

Another object of the invention is to provide a process in which a portion of beef, pork, lamb, poultry, fish and other such natural meats or vegetable protein which can be, if desired, incorporated with the pork products normally utilized and which may be used to control the flavor, texture, and within limits the animal to vegetable oil and fat content and cost characteristics of the bacon analogue.

Another aspect of the invention is the preparation of separate comminuted fat and lean meat components which have a particle size ranging from less than 1 mm to 10 mm (0.03 ounces to 0.5 ounces). The comminuted fat and lean components are formulated by passing the meat through a grinder such as a dual plate emulsifier or an emulsifier having plate openings of about 1 mm to 10 mm. Where a dual plate mincemaster is utilized to prepare the fat and lean components the meat is typically ground through a 5 mm plate and then 3 mm plate so that the largest meat particles are 3 mm or less. In the preparation of the fat and lean meat components the largest particle size and its distribution in both the fat and lean meat components is generally limited by the design of the extruding die so that the die does not become plugged with the large chunks of meat. The fat meat component is then subjected to a salt soluble protein extraction step. Thereafter the fat and lean meat components are extruded, layered or otherwise joined in any desired proportion and configuration of fat to lean component without being limited by employing individual pieces of meat surrounded by a creamy extrudate.

A further object of the invention is the preparation of small strips or particles of meat of 10 mm or less which after salt soluble protein extraction bind to one another and also bind to a second meat component to provide a two component meat system.

Another aspect of the invention involves the separate comminution and compounding of both the fat and lean meat components so that each component may thereafter be subsequently joined by layering or extrusion without binding the components to yield a two component meat product.

A further object of the invention is to provide a process which enables other portions of the animal to be utilized in the manufacture of a product which is similar to natural bacon.

A further object of the invention is to provide a process which is economical in production and provides a protein rich bacon analogue which maintains the texture, taste and consistency of bacon after cooking.

Other such objects and advantages of the present invention will become apparent to those skilled in the art from the specification in conjunction with the appended drawings which illustrate a slice of the novel bacon analogue of the present invention.

DESCRIPTION OF THE DRAWINGS

FIG. 1 is a front elevational view depicting one arrangement of fat to lean meat for a slice of the bacon analogue produced in accordance with the invention;

FIG. 2 is a front elevational view of a slice of the bacon analogue produced according to the invention depicting an alternative arrangement of fat and lean meats; and FIG. 3 is an enlarged fragmentary view of FIG. 2 illustrating the particles in the fat and lean meat layers.

In the drawings like characters of reference indicated corresponding parts in FIGS. 1 and 2.

DETAILED DESCRIPTION

Referring now to FIGS. 1, 2 and 3, reference character 10 illustrates a bacon slice analogue of substantially rectangular configuration having a portion 11 formed from a comminuted fat mixture and having areas of lean meat 12 formed therein, said areas of lean meat being formed from a comminuted lean meat mixture. Similarly, in FIG. 2 an alternative configuration is depicted of a lean meat portion 12 in relation to the comminuted fat mixture portion 11 obtained by modification of the configuration of the extrusion die.

The fat component 11 is composed of a comminuted fat component of meat particles 13 (FIG. 3) of about 1 to 10 millimeters in size and weighing from about 0.03 to 0.5 ounces. The preferred size of the fat meat particles are about 3 millimeters and weigh about 0.16 ounces. Similarly, the lean meat component is composed of a plurality of meat particles 14 (FIG. 3) of about 1 to 10 millimeters in size and weigh from about 0.03 to 0.5 ounces that are bound to one another and to the fat meat component at the fat and lean component boundary interface 15. The particles 14 of the lean meat component may also be in the form of strips and pieces of meat of a larger particle size in comparison to the lean meat component as long as sufficient surface area is present to allow the lean meat component to maintain its find with other adjacent pieces of lean meat.

It will be immediately recognized and understood by those skilled in the art that the areas of lean appearing meat may be varied as to size, quantity and shape as desired and other phase or lean to fat striations are contemplated by the invention not only for bacon but other multi-phased meat products, all of which are within the scope of the present invention.

In the preferred embodiment of the invention a bacon analogue is prepared by extruding a comminuted fat meat component or mixture treated with a curing pickle and a communited lean meat mixture which by employing the novel extrusion process of the invention, produces a meat slab resembling a pork belly having fat and lean layers as indicated by reference characters 11 and 12 as heretofore discussed. As will be recognized by those skilled in the art, the advantages of the present invention are not dependent upon vegetable and dairy binders or other agents to maintain the phase cohesion but rather upon the extrusion and curing processes of the present invention.

The novel bacon analogue and its respective fat and lean phases or layers is formulated from comminuted fat and comminuted lean mixtures prepared from pork, beef, lamb, poultry, fish and other such natural meats or vegetable protein or mixtures thereof.

In the specification and claims of the invention it will be understood that the terms "fat", "fat mixture", "fat appearing mixture" or "fat component" includes pure fat or meats with a high fat content or a mixture of various meats and fats which is in an uncooked and/or cured condition prior to thermal treatment. "Lean", "lean component", "lean mixture", "lean appearing mixture" or "lean meat" is a mixture of predominantly lean meat with or without fat addition and also in an uncooked and/or cured condition prior to thermal treatment. Furthermore, these terms are relative to one another such that the fat mixture is richer by about 20–30% in fat content in proportion to the lean mixture. In this regard, it should be noted that the fat and lean components can be formed from any meat such as pork, beef, lamb, poultry, fish and other such natural meats and combined, within limits, with a vegetable protein or mixture thereof to yield extrudable comminuted fat and lean components. The percent by weight limitation of vegetable protein to natural meat in the comminuted fat component is about 25% by weight to 75% by weight and in the lean component, the natural vegetable protein may be exclusively employed with the preferred range being about 1% to 75% vegetable protein by weight to 99% to 25% by weight natural meat protein by weight. It will of course be recognized by those skilled in the art that with increased proportions of vegetable proteins, additional flavoring, coloring and other such additives are employed.

While various meats such as beef, poultry and fish may advantageously be employed including parts of the pork animal in the preparation of a bacon or other meat analogue in accordance with the invention, it has been found that 80% by weight lean boneless pork butts provides the preferred ingredient for the lean meat component and pork jowls and back fat mixture of about 70% by weight jowls to 30% by weight back fat produces a preferable fat meat mixture. In the preferred application of the invention the pork is fresh or a combination of fresh pork with a limit of 30% by weight frozen or 50% by weight defrosted pork which is utilized in the fat meat comminuted component.

The fat component which has generally already been ground is mixed and treated with a curing pickle in a conventional mixer. The curing pickle applied to the comminuted fat may contain spices and other optional ingredients which may, of course be varied depending upon the desired taste and appearance of the final product. The essential ingredient of the curing pickle is salt. In the preferred embodiment of the invention a coloring agent and bacteriostat such as sodium nitrite is also utilized. One such suitable curing pickle generally employed which is not to be considered limiting, may be composed of approximately the following:

7%–8% by weight of salt
5%–6% by weight of sugar
0.5% by weight of sodium erythorbate
0.1%–0.2% by weight of soluble spices
0.05% sodium nitrite Maximum protein extraction may be accomplished during the mixing step if the temperature of the mix is maintained reasonably high enough to perform this task but not too high to create smearing. The preferred time of protein extraction is about 15 minutes when a temperature of about 45° to 50° F. is utilized for the mixing step and curing pickle treatment of the fat meats. One skilled in the art will recognize that the time and temperature is interdependent and that the higher the fat content in the fat component the longer and/or higher the extraction temperature and times which, of course, is limited by the smearing property of the fat component.

This temperature and time parameter is particularly important since the pickle cure of the fat meat component is believed to remove salt soluble proteins which then act as the natural binding agents of the meat tissues. As heretofore discussed, the present invention achieves its advantages of multi-phase and layer integrity without the addition or necessity of vegetable and dairy binding agents. The natural binding of the proteins in the layers of the fat and lean components result from the extrusion process as will hereinafter be described and the process of treating the proteins with the pickle cure.

After mixing and treatment with the curing pickle the comminuted fat meat mixture is transferred from the mixer to a vacuum silent cutter which is conventional in operation. The temperature of the fat meat components is taken and the amount of dry ice is calculated and added in an amount necessary to provide an extrudable mixture while the silent cutter is slowly rotating thereby yielding a fairly stiff emulsion. Typically the reduction of temperature to provide an extrudable mixture is in the range of about 34° F. to 40° F. which assists in the process by maintaining the integrity of the salt soluble protein bind. This temperature range of course varies with the precise fat content of the components but is recognized by those skilled in the art as the temperature at which a fat emulsion exhibits the tendency to create smearing.

Once the temperature of about 34° F. to 40° F. is attained, the interior is placed under a vacuum and the silent cutter is speeded up to chop the meats to a fine emulsion. As heretofore discussed, the lowering of the temperature and its maintenance at that level is important to prevent further breakdown of proteins that in conjunction with the novel extrusion process assist in the binding action of the pickle treated proteins. As soon as the chopping is complete, a further period of time under vacuum is allowed while the silent cutter blades are stopped, to ensure that all carbon dioxide, air and other gases have escaped from the emulsion. The vacuum is released and the fat meats are now ready for the extrusion step. If the fat meats are not being extruded immediately, they should be maintained in a cooler so that they can maintain the fairly stiff emulsion desired for the extruding step. Ideally the temperature should be maintained in the range of 45° F. to 48° F. While higher and lower extrusion temperatures may be employed, the maximum advantages of the present invention are achieved by utilizing an extruding temperature which is kept at a minimum of about 40° F. and a maximum of about 55° F. Although the example for the preparation of the fat appearing meats is for pork other meats such as beef, lamb, poultry, fish and vegetable protein may be substituted in all or part, with only slight modification to the procedure.

As heretofore discussed, the basic formula for the lean meats is beef, pork, lamb, poultry, fish and other such meats and vegetable protein, or mixtures thereof. Optionally, other ingredients or similar ingredients as were introduced to the fat meat component, may be introduced into the comminuted lean mixture including but not limited to water, salt, cane or beet sugar, monosodium glutamate, liquid smoke, spices, erythorbic acid and sodium nitrite. Preferably the lean meat component also includes a salt soluble protein extraction step to assist in the binding of the lean meat particles to one another. Similarly the essential ingredient for the salt soluble protein extraction of the lean meat component is salt with other optional ingredients as described with reference to the salt soluble protein extraction of the fat meat component. The lean meats are mixed with the selected optional ingredients and comminuted in a manner similar to the fat component except a silent cutter is generally not necessary and the lean meat component is placed in a vacuum blender or mixer. Thereafter the air and other gases are released and the temperature adjusted to form an extrudable fluid which is generally in the range of about 40° F. to 55° F. It should be noted that during the mixing step of the lean meats, the temperature of the mix must be high enough to keep the lean meats rather soft relative to the fat meats so as to produce a suitable pattern during extrusion for if the lean meats are too cold, they will not extrude properly. Similar to the process with respect to the fat mixture, if the lean meats are not being extruded immediately, they should be kept at a temperature close to the temperature they were at the time of mixing. In the foregoing discussion for the preparation of the lean appearing meats from a pork source, beef, lamb, polutry, fish and other such meats or vegetable protein may be substituted in all or part, with only slight modification to the procedure.

Alternately both the fat meats and lean meats can be put through an emulsifier machine such as a dual plate mincemaster. In the case of the fat meats, this takes place after the mixing step and does away with the vacuum silent cutter part of this operation. If this alternative embodiment is utilized then during a 20-minute mixing period, the last 10 minutes are under a vacuum. In the case of the lean meats, they are put through the mincemaster after the vacuum mixing step. Preferred plate size for the dual plate mincemaster are a 5 mm and a 3 mm. This combination can be used on both fat meats and lean meats.

The lean meats and fat meats mixtures are placed in separate hoppers in an extrusion machine, and extruded through dies of a desired fat-to-lean configuration for the final product. It will be recognized by those skilled in the art that the fat and lean hoppers should be kept filled at all times during extrusion and that the die parts should be kept clean. Optimum results are achieved in the present invention when the pump pressure on the fat mixture is maintained at a slightly higher pressure than the lean pump pressure. Generally, these pressure differentials are modified to accommodate the extrudability of the respective fat and lean components and are in a range of from about 1 to 20 psi. The preferred range is 1–10 psi so as to provide a slightly higher fat ratio over the lean in the slab. These pressures apply to air operated pumps such as Warricks or St. Regis. For other types of pumps these ranges may not be applicable. The two mixtures are extruded through a die and past mold heads to be extruded in a ribbon-like strip with the lean and fat meat mixtures being layered in shapes similar to that illustrated in the drawings and as they leave the extruding die head. The ribbon of layered mixture is placed in pans shaped to form a uniform slab after heat processing. Slabs that may be used in this process are similar to those illustrated and described in Canadian patent application Ser. No. 267,282.

The extruded bacon analogue is then placed in pans and loaded onto conventional conveying equipment and are placed into a batch or continuous type smokehouse in a manner which is well known to those skilled in the art. The product is then conveniently and optionally smoked in a conventional manner and heat processed at a schedule of increasing temperatures until an internal temperature of between 148° F. and 156° F. is reached with the ideal temperature being 150° F. The slabs are then removed from the pans and cooled to a temperature ideal for slicing the slab into strips similar to bacon.

When using pork, poultry, fish or vegetable protein for the lean meats the curing of the mixtures should be from 1 to 3 days depending upon the ingredients of the mixtures. No curing period is required when beef is used in the lean meat mixture.

The following examples are for the purpose of further illustrating the preparation of the novel product and process of the invention and in the following examples all percentages are by weight.

EXAMPLE 1

In this Example, 51% by weight pork jowls along with 23% by weight pork back fat was employed as the fat meat component along with a curing pickle composed of 8% salt, 6% sugar, 0.5% sodium erythorbate. 0.4% monosodium glutamate, 0.2% liquid smoke, with the remaining percent water, all of the foregoing proportional percentages being by weight to prepare a comminuted pickle fat component. First, the meat was ground through a fine plate in a conventional grinder along with the above ingredients which compose the curing pickle. The resulting mass is mixed for approximately 15 minutes at a temperature of 50° F. The resulting mixture was transferred to a silent cutter and dry ice was added to drop the temperature to 34° F. and chopped for a period of two minutes. The resultant fat component in the form of an emulsion at a temperature of 40° F. is removed from the cutter and is ready for extrusion.

EXAMPLE 2

In this Example, beef, 66% by weight boneless carcass beef, is ground through a fine plate into a mixture of 10% by weight fat meats as prepared in Example 1. To this mixture was added the following ingredients all of which are expressed in percents by weight of the curing pickle, 8% salt, 6% sugar, 0.5% sodium erythorbate, 0.4% monosodium gultamte, 0.2% liquid smoke, to prepare a communited lean component. The meat and ingredients are mixed 2 minutes on and 2 minutes off for a period of 10 minutes under a vacuum. The vacuum is removed and the resultant mass is mixed sufficiently to obtain a satisfactory bind but not over mixed to produce too tight a bind. The resulting mixture is at about 52° F. and is ready for extrusion.

EXAMPLE 3

In this Example the fat meat component of Example 1 was separately extruded with the lean meat component of Example 2. During the extrusion process, the lean meat is at a temperature of 50° F. with pressure the same at the beginning of the extrusion process. The resulting ribbon-like slab is inspected for the desired lean-to-fat configuration of the resulting product and the pressure adjusted to maintain this fat lean ratio. The resulting slab is cured, smoked and thereafter sliced and fried to yield a delicious bacon slice that did not separate upon fry-out.

EXAMPLE 4

In this Example, 51% by weight pork jowls along with 23% by weight pork back fat was employed as the fat meat component along with a curing pickle composed of 8% salt, 6% sugar, 0.5% sodium erythorbate, 0.4% monosodium glutamate, 0.2% liquid smoke, with the remaining percent water, all of the foregoing proportional percentages being by weight to prepare a comminuted pickle fat component. First, the meat was ground through a fine plate in a conventional grinder along with the above ingredients which compose the curing pickle. The resulting mass is mixed for approximately 15 minutes at a temperature of 50° F. The resulting mixture was transferred to a silent cutter and dry ice was added to drop the temperature to 34° F. and chopped for a period of 2 minutes. The resultant fat component in the form of an emulsion at a temperature of 40° F. is removed from the cutter and is ready for extrusion.

EXAMPLE 5

In this Example pork butts trimmed to 80% lean are combined with a curing pickle composed of 8% salt, 6% sugar, 0.5% sodium erythorbate, 0.4% monosodium glutamate, 0.2% liquid smoke, to prepare a comminuted lean component. The meat and ingredients are ground and mixed 2 minutes on and 2 minutes off for a period of 10 minutes under a vacuum. The vacuum is removed and the resultant mass is mixed sufficiently to obtain a satisfactory bind but not over mixed to produce too tight a bind. The resulting mixture is at about 52° F. and is ready for extrusion.

EXAMPLE 6

In this Example the fat meat component of Example 4 was extruded with the lean meat component of Example 2. During the extrusion process, the lean meat is at a temperature of 50° F. with pressure at the beginning of the extrusion process. The resulting ribbon-like slab is inspected for the desired lean-to-fat configuration of the resulting product and the pressure adjusted to maintain this fat lean ratio. The resulting slab is cured, smoked and thereafter sliced and fried to yield a delicious bacon slice that did not separate upon fry-out.

EXAMPLE 7

In this Example, 50% by weight ham fat was combined with 22% picnic trimmings and 3% soya concentrate. First, the meat was ground through a fine plate in a conventional grinder along with the a curing pickle composed of 8% salt, 6% sugar, 0.5% sodium erythorbate, 0.4% monosodium glutamate, 0.2% liquid smoke, with water constituting the remaining percent. The resulting mass is mixed for approximately 15 minutes at a temperature of 50° F. The resulting mixture was transferred to a silent cutter and dry ice was added to drop the temperature to 34° F. and chopped for a period of 2 minutes. The resultant fat component in the form of an emulsion at a temperature of 40° F. is removed from the cutter and is ready for extrusion.

EXAMPLE 8

In this Example, beef, 66% by weight boneless carcass beef, is ground through a fine plate into a mixture of 10% by weight fat meats as prepared in Example 1. To this mixture was added a curing pickle composed of the following ingredients all of which are expressed in percents by weight, 8% salt, 6% sugar, 0.5% sodium erythorbate, 0.4% monosodium gultamate, 0.2% liquid smoke, to prepare a comminuted lean component. The meat and ingredients are mixed 2 minutes on and 2 minutes off for a period of 10 minutes under a vacuum. The vacuum is removed and the resultant mass is mixed sufficiently to obtain a satisfactory bind but not over mixed to produce too tight a bind. The resulting mixture is at about 52° F. and is ready for extrusion.

EXAMPLE 9

In this Example the fat meat component of Example 1 was extruded with the lean meat component of Example 2. During the extrusion process, the lean meat is at a temperature of 50° F. with pressure at the beginning of the extrusion process. The resulting ribbon-like slab is inspected for the desired lean-to-fat configuration of the resulting product and the pressure adjusted to maintain this fat lean ratio. The resulting bacon product had more delicate bacon flavor and less fry-out and had maintained the layer striation integrity.

EXAMPLE 10

In this example, 51% by weight pork jowls along with 23% by weight pork fat was employed as the fat meat component along with a curing pickle composed of 8% salt, 6% sugar, 0.5% sodium erythorbate, 0.4% monosodium glutamate, 0.2% liquid smoke, 0.05% sodium nitrite, with water constituting the remaining percent. The resulting mass was mixed for approximately 20 minutes at a temperature of 50° F. The last 10 minutes being under vacuum. The resulting mixture was transferred to a dual plate mincemaster. The first plate being 3 mm in size and the second plate 1.4 mm in size. This provides an approximate reduction in particle weight from 0.16 ozs. to 0.07 ozs. The resulting fat component emulsion is ready for extrusion at a temperature of 50° F.

EXAMPLE 11

In this Example, beef, 66% by weight boneless carcass beef, is ground through a fine plate into a mixture of 10% by weight fat meats. To this mixture was added the following ingredients all of which are expressed in percents by weight of the curing pickle, 8% salt, 6% sugar, 0.5% sodium erythorbate, 0.4% monosodium glutamate, 0.2% liquid smoke, 0.05% sodium nitrite, to prepare a comminuted lean component. The meat and ingredients are mixed 2 minutes on and 2 minutes off for a period of 10 minutes under a vacuum. The vacuum is removed and the resultant mass is mixed sufficiently to obtain a satisfactory bind but not over mixed to produce too tight a bind. The resulting mixture is at about 50° F. and is ready for extrusion.

EXAMPLE 12

In this Example the fat meat component of Example 10 was extruded with the lean meat component of Example 11. During the extrusion process, the lean meat is at a temperature of 50° F. with equal pressure on both the fat and lean meats at the beginning of the extrusion process. The resulting ribbon-like slab is inspected for desired lean-to-fat configuration of the resulting product and the pressure adjusted to maintain this fat-to-lean ratio. The resulting slab is cured, smoked and thereafter sliced and examined before and after being fried. The resulting bacon product had an improved white color of the fat appearing meats with a lower fry-out.

EXAMPLE 13

In this Example, beef, 66% by weight boneless carcass beef, is ground through a medium fine plate into a mixture of 10% by weight fat meats as prepared in Example 10. To this mixture was added a curing pickle composed of the following ingredients all of which are expressed in percents by weight: 8% salt, 6% sugar, 0.5% sodium erythorbate, 0.4% monosodium glutamate, 0.2% liquid smoke, 0.05% sodium nitrite to prepare a comminuted lean component. The ingredients are mixed 2 minutes on and 2 minutes off for a period of 10 minutes under a vacuum. The vacuum is removed and the resultant mass transferred to a dual plate mincemaster. The first plate being 3 mm in size and the second plate 2 mm in size. This provides an approximate reduction in particle weight from 0.16 ozs. to 0.1 ozs. The resulting lean component emulsion is now ready for extrusion at a temperature of 50° F.

EXAMPLE 14

In this Example, the fat meat component of Example 10 was extruded with the lean meat component of Example 13. During the extrusion process the lean meat is at a temperature of 50° F. with equal pressures on both the fat and lean meats at the beginning of the extrusion process. The resulting ribbon-like slab is inspected for desired lean-to-fat configuration of the resulting product and the pressure adjusted to maintain this fat to lean ratio. The resulting slab is cured, smoked and thereafter sliced and examined before and after being fried. The resulting bacon product had too fine a particle size to the lean appearing meats but with an improved bite characteristic on being fried.

EXAMPLE 15

Same as Example 10 except the plate sizes were changed to 5 mm for the first and 3 mm for the second. This provides an approximate reduction in particle weight from 0.26 ozs. to 0.16 ozs.

EXAMPLE 16

Same as Example 13 except the plate sizes were changed to 5 mm for the first and 3 mm for the second. This provides an approximate reduction in particle weight from 0.26 ozs. to 0.16 ozs.

EXAMPLE 17

In this Example, the fat meat components of Example 15 were extruded with the lean meat components of Example 16. During the extrusion process the lean meat is at a temperature of 50° F. with equal pressures on both the fat and lean meats at the beginning of the extrusion process. The resulting ribbon-like slab is inspected for desired lean-to-fat configuration of the resulting product and the pressure adjusted to maintain this fat to lean ratio. The resulting slab is cured, smoked and thereafter sliced and examined before and after being fried. The resulting bacon product had a very acceptable appearance to both the fat and lean appearing meats with improvements on being fried in a bite appeal and in a lower fry-out. Alternately, both the fat meats and lean meats can be put through an emulsitor machine such as a dual plate mincemaster. In the case of the fat meats this takes place after the mixing step and does away with the vacuum silent cutter part of this operation. If this route is taken, then during a 20-minute mixing period, the last 10 minutes are under a vacuum. In the case of the lean meats, they are put through the mincemaster after the vacuum mixing step. Preferred plate sizes for the dual plate mincemaster are a 5 mm and a 3 mm. This combination can be used on both fat meats and lean meats.

While the comminuted lean pork and beef and vegetable mixtures have been described by way of example, it will be recognized that lamb, poultry, fish and other such meats can be used as either the lean meat component or fat component. After processing the bacon slab analogue, it has been found that between 24° F. and 28° F. is a convenient temperature for the slicing and enables the slices to be consistent and also they can be handled readily and easily. The slices have an uncooked appearance remarkably close to bacon and are consistent in terms of percentage lean to percentage fat and in the distribution of the lean throughout the slice.

Liquid smoke may be used in the mixture to produce a bacon analogue flavor which is equivalent to bacon when cooked and the fry-out is substantially less than bacon and the fried appearance substantially better inasmuch as the slice does not twist or curl but fries flat probably due to the higher lean content.

The invention has been discussed with particular reference to bacon analogues formed by the process of the invention utilizing novel conditions to insure cohesion of the layers in the same manner as in natural bacon before and after cooking. For example, it will be recognized by those skilled in the art that the present invention may be modified to produce other similar multi-phased meats such as corned beef, back bacon and other such multi-phased meats in the application of the invention. It will be further appreciated that substitutions and modifications may be made in the process by those skilled in the art without departing from the scope of the invention. Consequently, these and various other modifications and substitutions may be made within the spirit and scope of the invention as defined in the following claims.

I claim:

1. A meat analogue containing bound discrete fat and lean components comprising:
   (a) at least one fat component prepared from a plurality of particles having a particle size of about 1 to 10 mm from a protein source selected from the group consisting of fat appearing cuts of pork, beef, lamb, poultry, fish, and vegetable protein, or mixtures thereof,
   (b) at least one lean component prepared from a plurality of particles having a particle size of about 1 to 10 mm from a protein source selected from the group consisting of lean appearing cuts of pork, beef, lamb, poultry, fish, and vegetable protein or mixtures thereof; and
   (c) a binding amount of a salt solution comprising soluble protein extracted from said fat component binding said fat and lean components into discrete fat and lean areas having sizes greater than the size of the particles when said fat and lean components are bound to each other to form said meat analogue, wherein said fat and lean areas are essentially uniform in shape laterally throughout said meat analogue.

2. The meat analogue of claim 1 wherein said lean component additionally comprises salt soluble proteins extracted from said lean component.

3. The meat analogue of claim 2 additionally comprising a bacteriostat.

4. The meat analogue of claim 3 wherein said bacteriostat is sodium nitrite.

5. The meat analogue of claim 2 wherein said salt solution additionally comprises sugar, sodium erythorbate, soluble spices and sodium nitrite.

6. The meat analogue of claim 2 further comprising sugar, monosodium glutamate, liquid smoke, spices erythorbic acid and sodium nitrite.

7. The meat analogue of claim 2 wherein said fat component is comprised of about 70% to 100% by weight pork jowls and 1% to 30% by weight back fat and said lean component is comprised of about 80% by weight lean boneless pork butts.

8. The meat analogue of claim 1 wherein said lean meat component and said fat meat component are composed of meat particles in the range of about 3 millimeters.

9. A meat analogue in accordance with claim 1 wherein the fat component is about 25% by weight vegetable protein.

10. A multiphased meat analogue containing bound discrete fat and lean components comprising:
   (a) at least one fat component prepared from a plurality of particles having a particle size of about 1 to 10 millimeters from a protein source selected from the group consisting of fat appearing cuts of pork, beef, lamb, poultry, fish, and vegetable protein, or mixtures thereof,
   (b) at least one lean component prepared from a plurality of particles having a particle size of about 1 to 10 millimeters from a protein source selected from the group consisting of lean appearing cuts of pork, beef, lamb, poultry, fish and vegetable protein, or mixtures thereof, and
   (c) a binding amount of a salt solution comprising soluble protein extracted from said fat and lean components binding said fat and lean components to each other to form said multiphased meat analogue,
wherein said fat and lean components are essentially uniform in shape laterally throughout said multiphased meat analogue.

11. The multiphased meat analogue of claim 10 additionally comprising a bacteriostat.

12. The multiphased meat analogue of claim 11 wherein said salt solution additionally comprises sugar, sodium erythorbate, soluble spices and sodium nitrite.

13. The multiphased meat analogue of claim 11 further comprising sugar, monosodium, glutamate, liquid smoke, spices, erythorbic acid and sodium nitrite.

14. A multiphase meat analogue in accordance with claim 10 wherein the fat component is about 25% by weight vegetable protein.

15. A multiphase meat analogue in accordance with claim 10 wherein the lean component includes salt soluble proteins extracted from said lean component which binds said lean component.

16. A multiphase meat analogue in accordance with claim 10 wherein the fat component includes salt soluble proteins extracted from said fat component which binds said fat component.

* * * * *